United States Patent
Lee et al.

(10) Patent No.: US 11,338,857 B2
(45) Date of Patent: May 24, 2022

(54) APPARATUS AND METHOD FOR ESTIMATING A SLOPE ANGLE OF A ROAD

(71) Applicants: HYUNDAI MOTOR COMPANY, Seoul (KR); KIA MOTORS CORPORATION, Seoul (KR)

(72) Inventors: Sang Heon Lee, Hwaseong-si (KR); Wan Ki Cho, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 44 days.

(21) Appl. No.: 16/854,298

(22) Filed: Apr. 21, 2020

(65) Prior Publication Data

US 2021/0070360 A1 Mar. 11, 2021

(30) Foreign Application Priority Data

Sep. 9, 2019 (KR) .................. 10-2019-0111713

(51) Int. Cl.
*B62D 15/02* (2006.01)
*B60W 40/09* (2012.01)
*B60W 30/182* (2020.01)

(52) U.S. Cl.
CPC ......... *B62D 15/029* (2013.01); *B60W 30/182* (2013.01); *B60W 40/09* (2013.01); *B62D 15/025* (2013.01)

(58) Field of Classification Search
CPC . B62D 15/029; B62D 15/025; B60W 30/182; B60W 40/09; B60K 28/16
See application file for complete search history.

(56) References Cited

U.S. PATENT DOCUMENTS

| | | | | |
|---|---|---|---|---|
| 2014/0067154 A1* | 3/2014 | Yu | ......................... | B60W 40/076 701/1 |
| 2014/0358397 A1* | 12/2014 | Gao | ......................... | B60T 8/172 701/90 |
| 2015/0183434 A1* | 7/2015 | Adamey | ............... | B60W 10/06 701/70 |
| 2016/0090006 A1* | 3/2016 | Yamazaki | ............. | B60W 10/08 701/22 |
| 2017/0297584 A1* | 10/2017 | Chen | ..................... | B60T 8/1755 |

\* cited by examiner

*Primary Examiner* — Jeff A Burke
*Assistant Examiner* — Jerrod Irvin Davis
(74) *Attorney, Agent, or Firm* — Lempia Summerfield Katz LLC

(57) ABSTRACT

An apparatus and a method are configured for estimating a slope angle of a road. The slope angle of a road is estimated based on a longitudinal slope angle of the road which is calculated based on a Kinematic model, an effective weight corresponding to a control amount of a driver and a filter constant to estimate the slope angle of the road with higher precision in the case of a U-turn, rapid acceleration, or rapid deceleration in which a longitudinal acceleration of the vehicle is remarkably increased. The apparatus includes a controller to estimate the slope angle of the road, based on a longitudinal slope angle of the road which is calculated based on a Kinematic model, an effective weight corresponding to a control amount of a driver and a filter constant, and an output device to output the estimated slope angle of the road.

11 Claims, 9 Drawing Sheets

APPARATUS AND METHOD FOR ESTIMATING A SLOPE ANGLE OF A ROAD

CROSS-REFERENCE TO RELATED APPLICATION

This application claims the benefit of priority to Korean Patent Application No. 10-2019-0111713, filed in the Korean Intellectual Property Office on Sep. 9, 2019, the entire contents of which are incorporated herein by reference.

TECHNICAL FIELD

The present disclosure relates to a technology provided in a vehicle to estimate a longitudinal slope angle (road slope angle in a travelling direction of the vehicle).

BACKGROUND

Recently released vehicles are equipped with electronic control systems that determine traveling situations, vary various control amounts to be matched to the traveling situation, and provide, to a driver, the state information of the vehicles.

Such electronic control systems perform the overall control of the vehicle based on the behavior information and the surrounding information of the vehicle and the control information (steering, acceleration, or declaration) of the driver. As a result, high precision is required with respect to the information.

In particular, the information on the slope angle of the road is utilized for various systems mounted in the vehicle, so precision is more important with respect to the information on the slope angle.

In general, the technology of calculating the slope angle of the road uses a Kinematic model. Such a Kinematic model is based on the variation in a yaw rate of the vehicle, a lateral speed of the vehicle, or a longitudinal speed of the vehicle. Accordingly, in the case of a U-turn, rapid acceleration, or rapid deceleration in which the longitudinal acceleration of the vehicle is remarkably increased, the slope angle of the road may not be calculated with high precision.

The matter described in the Background art is made for the convenience of explanation, and may include matters other than a prior art well known to those of ordinary skill in the art.

SUMMARY

The present disclosure has been made to solve the above-mentioned problems occurring in the prior art while advantages achieved by the prior art are maintained intact.

An aspect of the present disclosure provides an apparatus and a method for estimating an inclination road of a vehicle. The apparatus and the method are capable of estimating the slope angle of a road, based on a longitudinal slope angle of the road. The longitudinal slope angle of the road is calculated based on a Kinematic model. The apparatus and the method are capable of estimating an effective weight corresponding to a control amount of a driver and a filter constant, to estimate the slope angle of the road with higher precision in the case of a U-turn, rapid acceleration, or rapid deceleration in which a longitudinal acceleration of the vehicle is remarkably increased.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, an apparatus for estimating a slope angle of a road may include a controller to estimate the slope angle of the road, based on a longitudinal slope angle of the road which is calculated based on a Kinematic model, an effective weight corresponding to a control amount of a driver and a filter constant. The apparatus may include an output device configured to output the estimated slope angle of the road.

In an example, the controller may estimate a road slope angle at a present time point using a road slope angle estimated at a previous time point and a road slope angle calculated at the present time point. The controller may estimate the road slope angle estimated at the previous time point, as the road slope angle at the present time point, when the effective weight is the minimum value. The controller may estimate the road slope angle at the present time point by reflecting the road slope angle estimated at the previous time point more than the road slope angle calculated at the present time point when the effective weight is not the minimum value.

Further, the controller may estimate the road slope angle at the present time point based on following Equation A, $$\hat{\theta}_{slope,n} = (1-K)\hat{\theta}_{slope,n-1} + K\theta_{slope} \quad \text{Equation A}$$

In this case, $\hat{\theta}_{slope,n}$ denotes the road slope angle estimated at the present time point, $\hat{\theta}_{slope,n-1}$ denotes the road slope angle estimated at the previous time point, $\theta_{slope}$ denotes the road slope angle calculated at the present time point, and K denotes the final weight.

In addition, the control amount of the driver may include at least one of an Accel Pedal Sensor (APS) value, a pressure value of a master cylinder, a steering angle of a vehicle, and/or a steering angular speed of the vehicle.

In addition, the controller may calculate, as an effective value, the minimum value among a lateral steering weight based on the steering angle and the steering angular speed of the vehicle, a longitudinal acceleration weight based on the APS value, and a longitudinal deceleration weight based on the pressure value of the master cylinder.

In an example, the lateral steering weight may be a lateral steering weight corresponding to a lateral factor ($L_{factor}$) based on the steering angle and the steering angular speed of the vehicle, $$L_{factor} = \frac{1}{(l_f+l_r)^2 C_f C_r + mV_x^2(l_r C_r - l_f C_f)} \times \{(l_f+l_r)C_f C_r V_x \delta_f + C_f l_f m V_x^2 \dot{\delta}_f\}$$

In this case, $l_f$ denotes a distance between a center of gravity of the vehicle and a front wheel, $l_r$ denotes a distance between the center of gravity of the vehicle and a rear wheel, $C_f$ denotes a front axle cornering stiffness, $C_r$ denotes a rear axle cornering stiffness, m denotes a total mass of the vehicle, $V_x$ denotes a longitudinal speed of the vehicle, $\delta_f$ denotes the steering angle of the vehicle, and $\dot{\delta}_f$ denotes the steering angle speed of the vehicle, respectively.

The apparatus may further include a storage to store $C_f$, $C_r$, $l_f$, $l_r$, and m, a longitudinal speed sensor to measure a longitudinal speed ($V_x$) of the vehicle, a steering angle sensor to measure the steering angle ($\delta_f$) of the vehicle, and a steering angular speed sensor to measure the steering angular speed ($\dot{\delta}_f$) of the vehicle.

According to another aspect of the present disclosure, a method for estimating a slope angle of a road may include: estimating the slope angle of the road, based on a longitudinal slope angle of the road which is calculated based on a Kinematic model, an effective weight corresponding to a control amount of a driver and a filter constant; and outputting the estimated slope angle of the road.

In an example, the estimating of the slope angle of the road may include estimating a road slope angle at a present time point using a road slope angle estimated at a previous time point and a road slope angle calculated at the present time point.

The estimating of the road slope angle at the present time point may include: estimating the road slope angle estimated at the previous time point, as the road slope angle at the present time point, when the effective weight is the minimum value; and estimating the road slope angle at the present time point by reflecting the road slope angle estimated at the previous time point more than the road slope angle calculated at the present time point when the effective weight is not the minimum value.

Further, the estimating of the road slope angle at the present time point may include estimating the road slope angle at the present time point based on the following Equation A, $$\hat{\theta}_{slope,n} = (1-K)\hat{\theta}_{slope,n-1} + K\theta_{slope} \quad \text{Equation A}$$

In this case, $\hat{\theta}_{slope,n}$ denotes the road slope angle estimated at the present time point, $\hat{\theta}_{slope,n-1}$ denotes the road slope angle estimated at the previous time point, $\theta_{slope}$ denotes the road slope angle calculated at the present time point, and K denotes the final weight.

In addition, the control amount of the driver may include at least one of an Accel Pedal Sensor (APS) value, a pressure value of a master cylinder, a steering angle of a vehicle, and/or a steering angular speed of the vehicle.

In addition, the estimating of the slope angle of the road may include calculating, as an effective value, the minimum value among a lateral steering weight based on the steering angle and the steering angular speed of the vehicle, a longitudinal acceleration weight based on the APS value, and a longitudinal deceleration weight based on the pressure value of the master cylinder.

In an example, the lateral steering weight may be a lateral steering weight corresponding to a lateral factor ($L_{factor}$) based on the steering angle and the steering angular speed of the vehicle, $$L_{factor} = \frac{1}{(l_f + l_r)^2 C_f C_r + mV_x^2(l_r C_r - l_f C_f)} \times \{(l_f + l_r) C_f C_r V_x \delta_f + C_f l_f m V_x^2 \dot{\delta}_f\}$$

In this case, $l_f$ denotes a distance between a center of gravity of the vehicle and a front wheel, $l_r$ denotes a distance between the center of gravity of the vehicle and a rear wheel, $C_f$ denotes a front axle cornering stiffness, $C_r$ denotes a rear axle cornering stiffness, m denotes a total mass of the vehicle, $V_x$ denotes a longitudinal speed of the vehicle, $\delta_f$ denotes the steering angle of the vehicle, and $\dot{\delta}_f$ denotes the steering angle speed of the vehicle, respectively.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
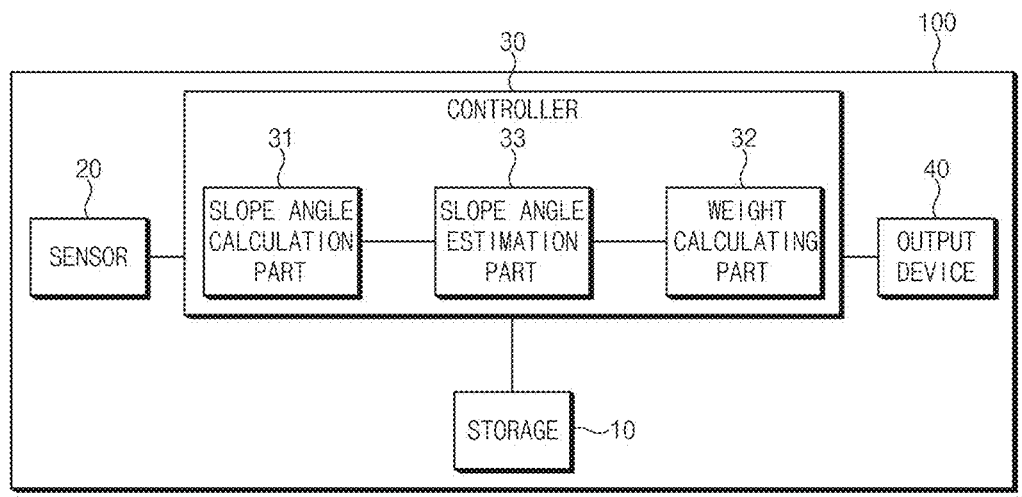
FIG. 1 is a block diagram illustrating an apparatus for estimating a slope angle of a road, according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those of ordinary skill in the art to which the present disclosure pertains. Such terms as those defined in a generally used dictionary are to be interpreted as having meanings equal to the contextual meanings in the relevant field of art and are not to be interpreted as having ideal or excessively formal meanings unless clearly defined in the present application.

FIG. 1 is a block diagram illustrating an apparatus for estimating a slope angle of a road, according to an embodiment of the present disclosure.

As illustrated in FIG. 1, the apparatus 100 for estimating the slope angle of the road may include a storage 10, a sensor 20, a controller 30, and an output device 40. In this case, according to an embodiment of the present disclosure, the components may be combined into each other to be implemented in one form, or some components may be omitted, depending on the manners of reproducing the apparatus 100 for estimating the slope angle of the road.

Regarding the components, the storage 10 may store various logic, various algorithms, and various programs required in the procedure of estimating the slope angle of the road, based on a longitudinal slope angle of the road which is calculated based on a Kinematic model, an effective weight corresponding to a control amount of a driver and a filter constant.

In particular, the storage 10 may store: front axle cornering stiffness ($C_f$); rear axle cornering stiffness ($C_r$); the distance ($l_f$) between the center of gravity of the vehicle and the front wheel; the distance ($l_r$) between the center of gravity of the vehicle and the rear wheel of the road; and the total mass of the vehicle. The storage 10 may further store a gravity acceleration and a low pass filter (LPF) constant.

In addition, the storage 10 may be implemented with at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, and/or an optical disk-type memory.

The sensor 20 is a module that provides various sensor values necessary to calculate the slope angle in a slope angle calculation part 31 and various sensor values necessary to calculate the weight in a weight calculating part 32. The sensor 20 may include a plurality of sensors.

The sensor 20 may include an acceleration sensor of the vehicle to measure the acceleration $a_x$ of the vehicle, a longitudinal speed sensor to measure the longitudinal speed $V_x$ of the vehicle, a lateral speed sensor to measure the lateral speed $V_y$ of the vehicle, and a yaw rate sensor to measure the yaw rate $W_z$ of the vehicle. For reference, each sensor is well known technology, and the details thereof have been omitted.

In addition, the sensor 20 may include an Accel Pedal Sensor (APS) to measure the pressing degree, which serves as a control amount of the driver, of an acceleration pedal by a driver, a pressure sensor to measure the pressure, which is generated in proportion to the pressing of a brake pedal by the driver, of the master cylinder, a steering angle sensor to measure the steering angle $\delta_f$ of the vehicle depending on the steering of the steering wheel by the driver, and a steering angular velocity sensor to measure a steering angular sensor $\dot{\delta}_f$ of the vehicle, based on the steering of the steering wheel by the driver. In this case, the APS outputs an APS value (%) indicating the pressing degree of the accelerator pedal.

The controller 30 performs the overall control such that the elements normally perform the inherent functions thereof. In addition, the controller 30 may be implemented in the form of hardware or software. The controller 30 may be implemented in the form of the combination of the hardware and the software. Preferably, the controller 30 may be implemented with a micro-processor, but the present disclosure is not limited thereto.

Such a controller 30 may estimate the slope angle of the road, based on the longitudinal slope angle of the road which is calculated based on the Kinematic model, an effective weight corresponding to the control amount of a driver, and a filter constant.

To this end, the controller 30, which serves as a functional block, may include, for example, the slope angle calculation part 31, the weight calculating part 32, and the slope angle estimation part 33.

First, the slope angle calculation part 31 may calculate the slope angle of the road based on the Kinematic model. For example, the slope angle calculation part 31 may calculate the slope angle $\hat{\theta}_{slope}$ of the road, based on following Equation 1.

$$\theta_{slope} = \sin^{-1}\left(\frac{-a_x + \frac{d}{dt}(V_x) - (W_Z * V_y)}{g}\right) \quad \text{Equation 1}$$

In this case, $a_x$ denotes the acceleration of the vehicle, $V_x$ denotes the longitudinal velocity of the vehicle, $V_y$ denotes the lateral velocity of the vehicle, $W_z$ denotes the yaw rate of the vehicle, and g denotes the acceleration of gravity. In addition, $$\frac{d}{dt}(V_x)$$

denotes the variation in the longitudinal velocity of the vehicle.

In the case of a U-turn, rapid acceleration, or rapid deceleration in which the longitudinal acceleration of the vehicle is remarkably increased, the precision may be remarkably degraded, because the slope angle $\theta_{slope}$ (road slope angle), which is calculated as described above, of the road, is based on the variation in the lateral speed of the vehicle, the yaw rate of the vehicle, and the longitudinal speed the vehicle.

The slope angle estimation part 33 may estimate the road slope angle at a present time point by applying the weight, which is calculated by the weight calculating part 32, to a road slope angle estimated at a previous time point and a road slope angle, which is calculated by the slope angle calculation part 31, at the present time point.

Next, the weight calculating part 32 may calculate weights to be applied to the road slope angle estimated at the previous time point and the road slope angle calculated at the present time point. In this case, the range of the weights may be a value in the range of '0' and '1'.

Figure 2A:
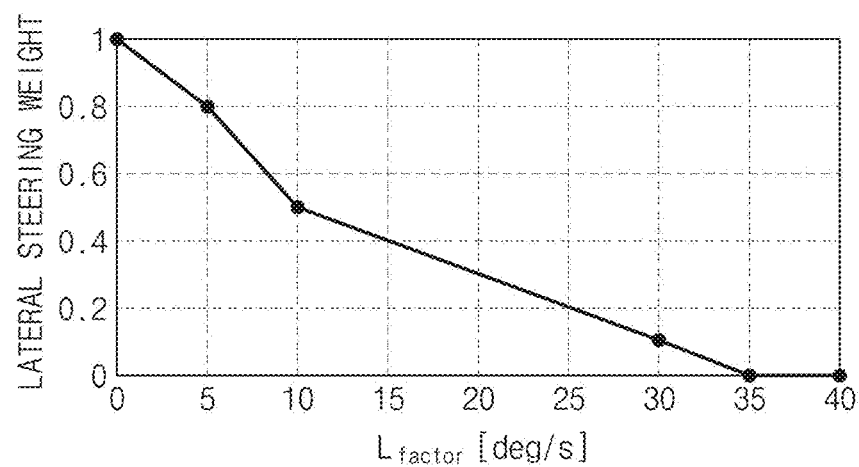
FIG. 2A is a view illustrating a lateral steering weight map provided in an apparatus for estimating the slope angle of a road, according to an embodiment of the present disclosure.
Figure 2B:
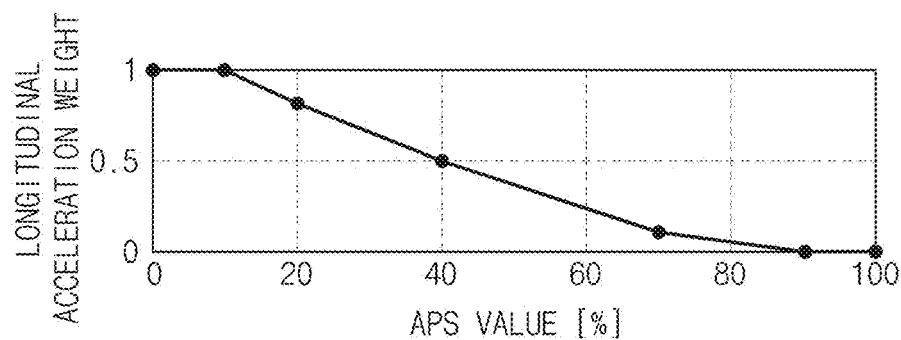
FIG. 2B is a view illustrating a longitudinal acceleration weight map provided in an apparatus for estimating the slope angle of a road, according to an embodiment of the present disclosure.
Figure 2C:
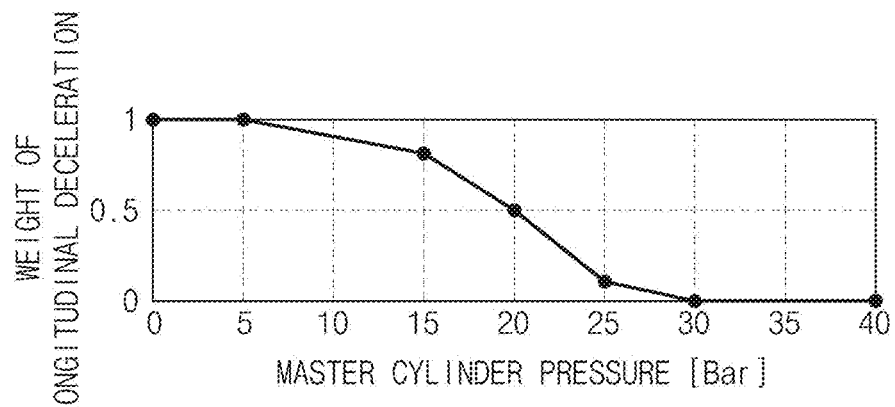
FIG. 2C is a view illustrating a longitudinal deceleration weight map provided in an apparatus for estimating the slope angle of a road, according to an embodiment of the present disclosure.

The weight calculating part 32 may store a weight map as illustrated in FIGS. 2A-2C.

FIG. 2A is a view illustrating a lateral steering weight map provided in the apparatus 100 for estimating the slope angle of the road, according to an embodiment of the present disclosure.

As illustrated in FIG. 2A, a vertical axis represents a lateral steering weight and a horizontal axis represents a lateral factor ($L_{factor}$). In this case, the weight calculating part 32 may calculate the lateral factor ($L_{factor}$) based on following Equation 2.

$$L_{factor} = \frac{1}{(l_f+l_r)^2 C_f C_r + mV_x^2(l_r C_r - l_f C_f)} \times \{(l_f+l_r)C_f C_r V_x \delta_f + C_f l_f m V_x^2 \dot{\delta}_f\} \quad \text{Equation 2}$$

Figure 3:
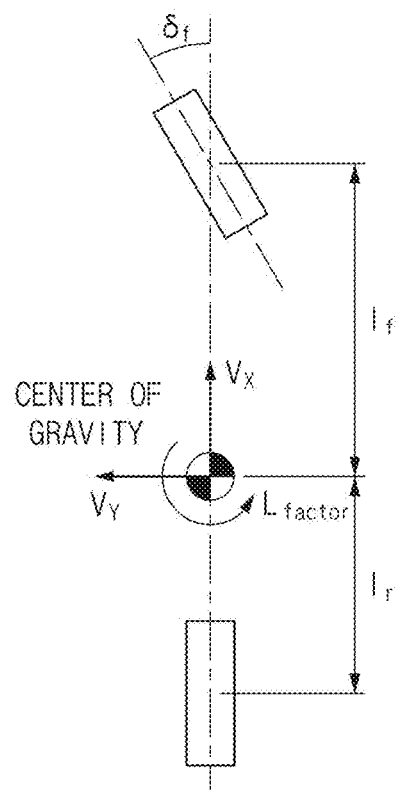
FIG. 3 is a view illustrating a factor used to estimate an inclination angle of a road by an apparatus for estimating the slope angle of a road, according to an embodiment of the present disclosure.

In this case, $l_f$ denotes the distance between the center of gravity of the vehicle and the front wheel, $l_r$ denotes the distance between the center of gravity of the vehicle and the rear wheel, $C_f$ denotes the front axle cornering stiffness, $C_r$ denotes the rear axle cornering stiffness, and m denotes the total mass of the vehicle, $V_x$ denotes the longitudinal speed of the vehicle, $\delta_f$ denotes the steering angle of the vehicle, and $\dot{\delta}_f$ denotes the steering angle speed of the vehicle, respectively. In this case, $l_f$, $l_r$, $V_x$, $V_y$, $L_{factor}$, and $\delta_f$ are illustrated in FIG. 3, in detail.

In addition, the first item of numerator items in Equation 2 is an item for the steering angle. The second item of the numerator items is an item for a steering angular velocity.

The weight calculating part 32 may calculate the lateral factor $L_{factor}$ by applying the value stored in the storage 10 and the value, which is measured by the sensor 20, to Equation 2. When the lateral factor $L_{factor}$ calculated as described above is '0', the lateral steering weight becomes '1', and when the lateral factor $L_{factor}$ is 40, the lateral steering weight becomes '0'.

FIG. 2B is a view illustrating a longitudinal steering weight map provided in the apparatus 100 for estimating the slope angle of the road, according to an embodiment of the present disclosure.

As illustrated in FIG. 2B, the vertical axis represents a longitudinal acceleration weight. The horizontal axis represents an APS value as a longitudinal acceleration factor. In this case, the APS value of the APS represents the pressing degree (%), which is measured by the APS, of the accelerator pedal.

The weight calculating part 32 may obtain the lateral acceleration weight corresponding to the APS value measured by the APS, based on the longitudinal acceleration weight map.

FIG. 2C is a view illustrating a longitudinal deceleration weight map provided in the apparatus 100 for estimating the slope angle of the road, according to an embodiment of the present disclosure.

As illustrated in FIG. 2C, the vertical axis represents a longitudinal deceleration weight. The horizontal axis represents the master cylinder pressure value as a longitudinal deceleration factor.

The weight calculating part 32 may obtain the lateral deceleration weight corresponding to the master cylinder pressure value measured by the pressure sensor, based on the longitudinal deceleration weight map.

Accordingly, as recognized from FIGS. 2A-2C, the weight calculating part 32 may obtain the lateral steering weight corresponding to the lateral steering factor, the longitudinal acceleration weight corresponding to the longitudinal acceleration factor (APS value), and the longitudinal deceleration weight corresponding to the longitudinal deceleration factor (master cylinder pressure value). The weight calculating part 32 may compare the lateral steering weight, the longitudinal acceleration weight, and the longitudinal deceleration weight, which are obtained, with each other. Thereby, the smallest weight is calculated (hereinafter, effective weight).

Figure 4A:
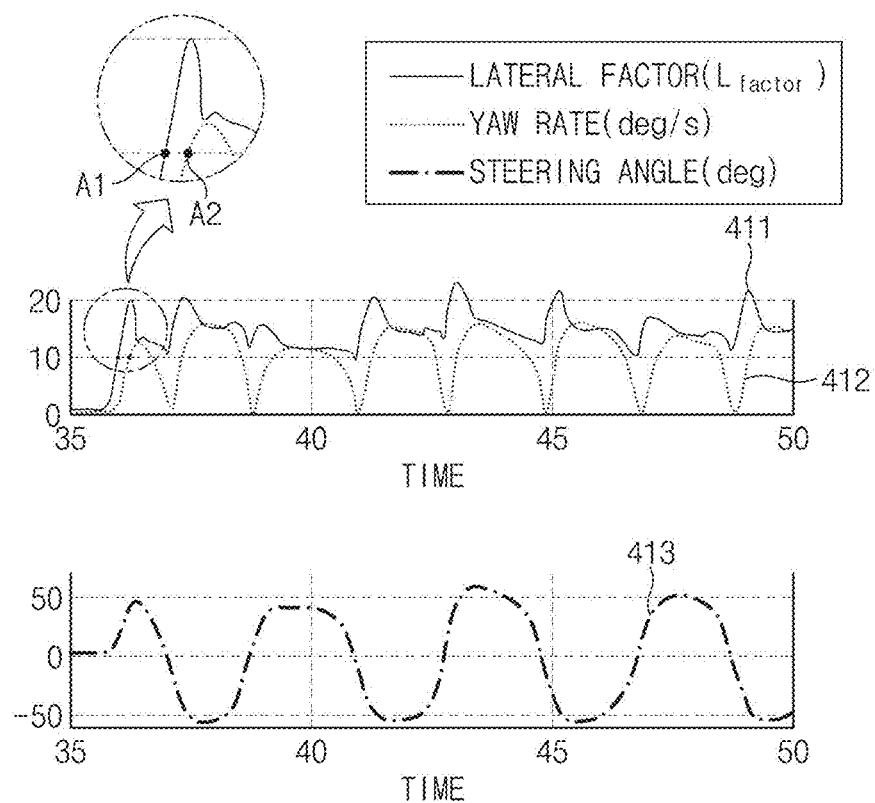
FIG. 4A is a view illustrating a relationship between a lateral factor ($L_{factor}$) and a yaw rate when a vehicle equipped with an apparatus for estimating a slope angle of a road performs Slalom driving, according to an embodiment of the present disclosure.
Figure 4B:
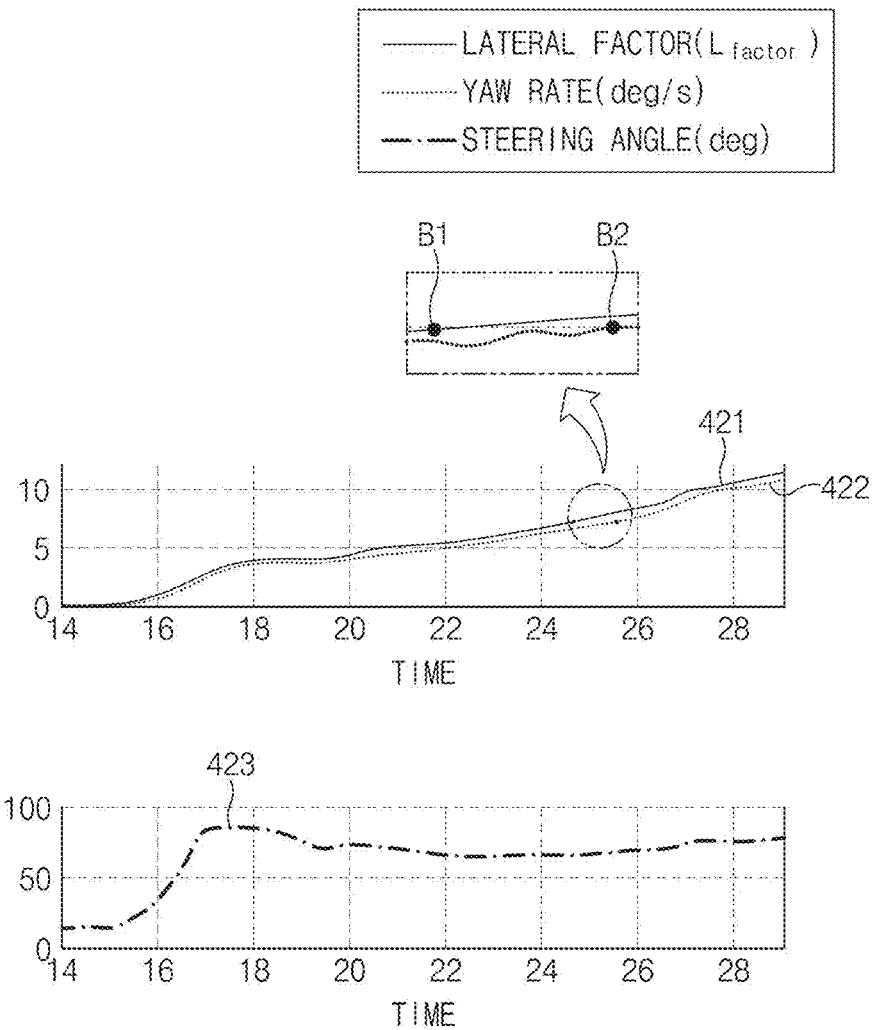
FIG. 4B is a view illustrating a relationship between a lateral factor ($L_{factor}$) and a yaw rate when a vehicle equipped with an apparatus for estimating a slope angle of a road performs turns, according to an embodiment of the present disclosure.

Meanwhile, the relationship between the lateral factor $L_{factor}$ calculated by the weight calculating part 32 and the yaw rate measured by the yaw rate sensor are illustrated in FIGS. 4A and 4B.

FIG. 4A is a view illustrating a relationship between a lateral factor $L_{factor}$ and a yaw rate when a vehicle equipped with the apparatus 100 for estimating the slope angle of the road performs Slalom driving, according to an embodiment of the present disclosure.

In FIG. 4A, reference numeral 411 represents the lateral factor, reference numeral 412 represents the yaw rate, and reference numeral 413 represents the steering angle.

It may be understood from the graph of FIG. 4A that a phase A1 of the lateral factor calculated by the weight calculating part 32 is 300 ms to 500 ms earlier than a phase A2 of the yaw rate measured by the yaw rate sensor.

In other words, when the lateral factor is used, the yaw motion of the vehicle may be predicted at 300 ms to 500 ms before the yaw motion. The yaw motion of the vehicle is proportional to the lateral motion of the vehicle. Accordingly, the slope angle calculation part 31 may predict that the precision of the calculated slope angle is lowered, in advance through the lateral motion of the vehicle.

FIG. 4B is a view illustrating a relationship between a lateral factor $L_{factor}$ and a yaw rate when a vehicle equipped with the apparatus 100 for estimating the slope angle of the road turns, according to an embodiment of the present disclosure.

In FIG. 4B, reference numeral 421 represents the lateral factor, reference numeral 422 represents the yaw rate, and reference numeral 423 represents the steering angle.

It may be understood from the graph of FIG. 4B that a phase B1 of the lateral factor calculated by the weight calculating part 32 is earlier than a phase B2 of the yaw rate measured by the yaw rate sensor.

Accordingly, the precision of the slope angle calculated by the slope angle calculation part 31 may be predicted, in advance, as being lowered by using the lateral factor when the vehicle turns.

Next, the road slope angle may be estimated based on the longitudinal slope angle of the road, which is calculated, by the slope angle calculation part 31, the filter constant calculated by the weight calculating part 32 and the effective value.

The slope angle estimation part 33 may estimate, for example, the road slope angle based on following Equation 3.

$$\hat{\theta}_{slope,n} = (1-K)\hat{\theta}_{slope,n-1} + K\theta_{slope} \quad \text{Equation 3}$$

In this case, $\hat{\theta}_{slope,n}$ denotes a road slope angle predicted at a present time point, $\hat{\theta}_{slope,n-1}$ denotes a road slope angle estimated at a previous time point, $\theta_{slope}$ denotes a road slope angle calculated at the present time point, and K denotes the final weight. In this case, K may be a value obtained by multiplying the effective weight by the filter constant (for example, 0.15).

For example, when the effective weight is '0', the road slope angle calculated at the present time point has no reliability. Accordingly, the effective weight of '0' is reflected in estimating the road slope angle at the previous time point instead of the road slope angle at the present time point.

In another example, when the effective weight is '1', the road slope angle at the present time point is estimated by using the road slope angle estimated at the previous time point and the road slope angle calculated at the present time point. In this case, the road slope angle estimated at the previous time point is more reflected than the road slope angle calculated at the present time point. In this case, the application rate of the road slope angle calculated at the present time point has the highest value but is lower than the application rate of the road slope angle estimated at the previous time.

The output device 40 may output the road slope angle estimated by the slope angle estimation part 33. The output device 40 may display the road slope angle on a cluster or may provide the road slope angle to various electronic control systems provided in the vehicle.

Figure 5A:
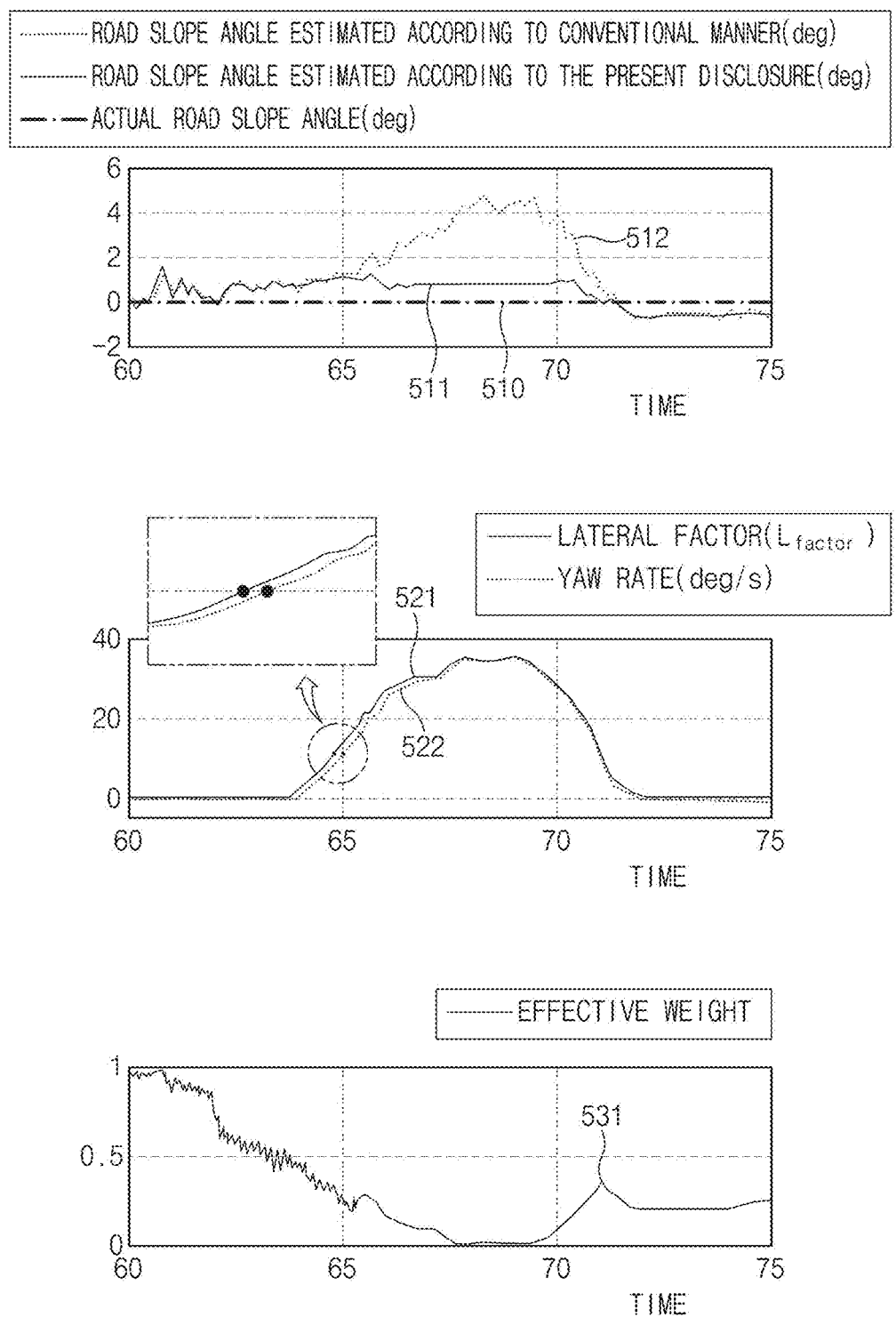
FIG. 5A is a view illustrating the performance of an apparatus for estimating a slope angle of a road, according to an embodiment of the present disclosure.

FIG. 5A is a view illustrating the performance of the apparatus 100 for estimating the slope angle of the road, according to an embodiment of the present disclosure. FIG. 5A illustrates the performance of estimating the road slope angle in the U-turn of the vehicle.

In FIG. 5A, reference numeral 510 represents an actual road slope angle, reference numeral 511 represents the road slope angle estimated by the apparatus 100 for estimating the slope angle of the road according to an embodiment of the present disclosure. Reference numeral 512 represents the road slope angle calculated by the slope angle calculation part 31.

In addition, reference numeral 521 represents a lateral factor, reference numeral 522 represents a yaw rate. Reference numeral 531 represents an effective weight calculated by the weight calculating part 32.

Accordingly, in the U-turn of the vehicle, the road slope angle 511 estimated by the apparatus 100 for estimating the slope angle of the road according to an embodiment of the present disclosure has the precision higher than the road slope angle 512 calculated by the slope angle calculation part 31.

Figure 5B:
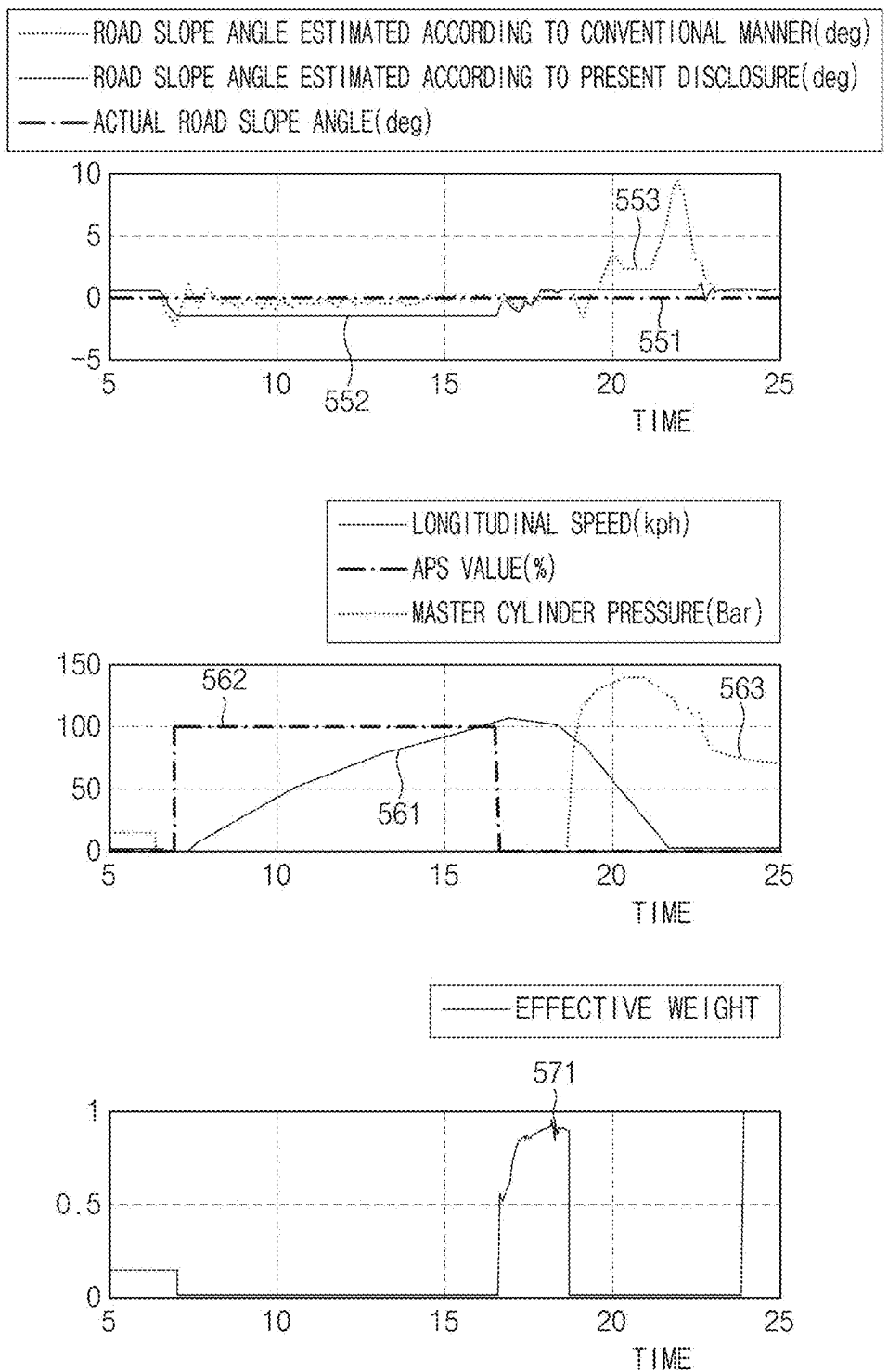
FIG. 5B is a view illustrating the performance of an apparatus for estimating a slope angle of a road, according to an embodiment of the present disclosure.

FIG. 5B is a view illustrating the performance of the apparatus 100 for estimating the slope angle of the road, according to an embodiment of the present disclosure, and especially illustrating the performance of estimating the road slope angle in the U-turn of the vehicle.

In FIG. 5B, reference numeral 551 represents an actual road slope angle. Reference numeral 552 represents the road slope angle estimated by the apparatus 100 for estimating the slope angle of the road according to an embodiment of the present disclosure. Reference numeral 553 represents the road slope angle calculated by the slope angle calculation part 31.

In addition, reference numeral 561 represents a longitudinal speed of the vehicle, reference numeral 562 represents an APS value. Reference numeral 563 represents a master cylinder pressure value. In this case, the acceleration of the vehicle is 0.3 G and the deceleration of the vehicle is 0.9 G.

In addition, reference numeral 571 represents the effective weight calculated by the weight calculating part 32.

Accordingly, in the rapid acceleration or the rapid deceleration of the vehicle, the road slope angle 552 estimated by the apparatus 100 for estimating the slope angle of the road according to an embodiment of the present disclosure has the precision higher than the road slope angle 553 calculated by the slope angle calculation part 31.

Figure 6:
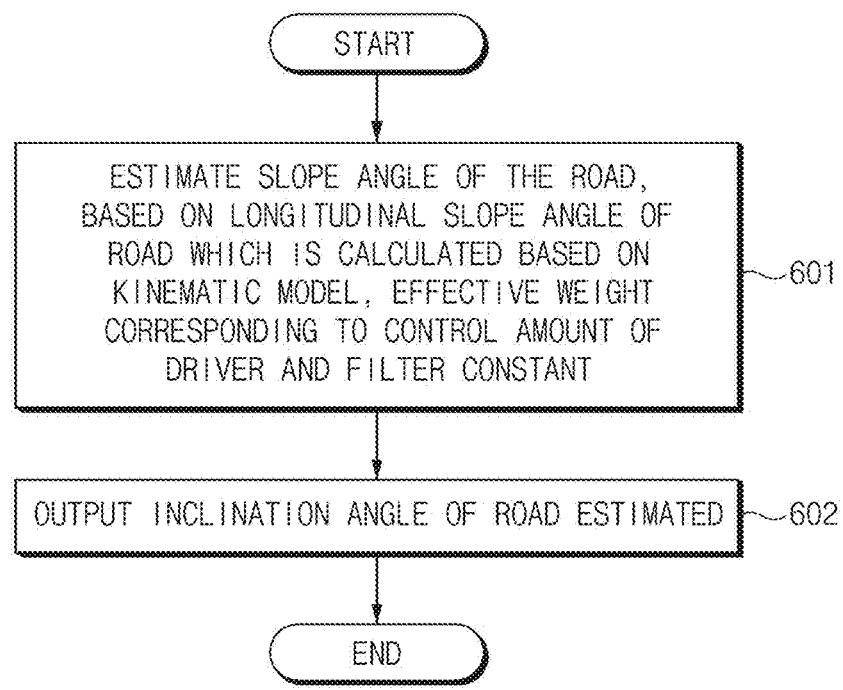
FIG. 6 is a block diagram illustrating a method for estimating a slope angle of a road, according to an embodiment of the present disclosure.

FIG. 6 is a block diagram illustrating a method for estimating a slope angle of a road, according to an embodiment of the present disclosure.

The controller 30 may estimate the slope angle of the road, based on the longitudinal slope angle of the road which is calculated based on the Kinematic model, an effective weight corresponding to the control amount of a driver and a filter constant (601). In this case, the controller 30 may use the information stored in the storage 10 and the value measured by the sensor 20.

Then the output device 40 outputs the slope angle of the road estimated by the controller 30 (602).

Figure 7:
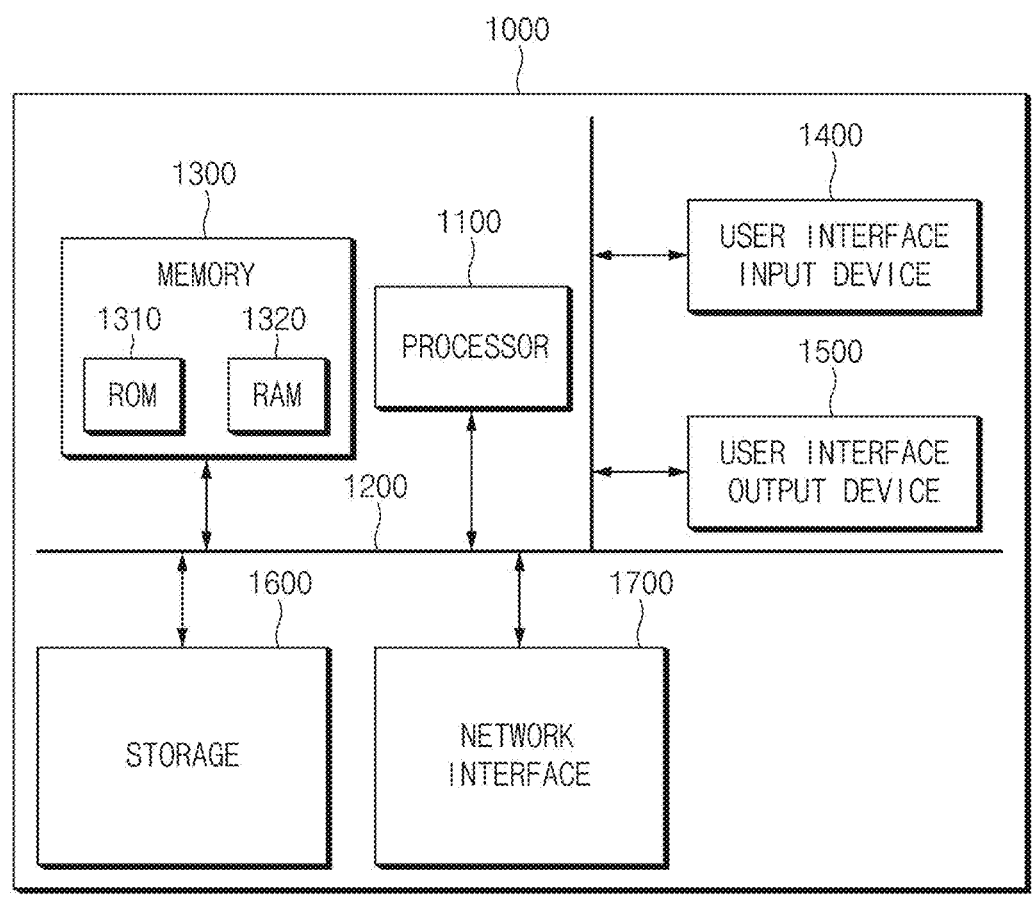
FIG. 7 is a block diagram illustrating a computing system to execute a method for estimating a slope angle of a road, according to an embodiment of the present disclosure.

FIG. 7 is a block diagram illustrating a computing system to execute a method for estimating the slope angle of the road, according to an embodiment of the present disclosure.

Referring to FIG. 7, according to an embodiment of the present disclosure, the method for estimating the slope angle of the road may be implemented through the computing system. A computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM memory, a flash memory, a ROM, memory an erasable and programmable ROM (EPROM), an electrically EPROM (EEPROM), a register, a hard disc, a solid state drive (SSD), a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to the apparatus and the method for estimating the slope angle of the road in an embodiment of the present disclosure, the slope angle of a road may be estimated based on the longitudinal slope angle of the road which is calculated based on the Kinematic model, the effective weight corresponding to the control amount of a driver and the filter constant to estimate the slope angle of the road in the case of the U-turn, the rapid acceleration, or the rapid deceleration in which the longitudinal acceleration of the vehicle is remarkably increased.

Hereinabove, although the present disclosure has been described with reference to various embodiments and the accompanying drawings, the present disclosure is not limited thereto. However, the present disclosure may be variously modified and altered by those of ordinary skill in the art to which the present disclosure pertains without departing from the spirit and scope of the present disclosure claimed in the following claims.

Therefore, embodiments of the present disclosure are not intended to limit the technical spirit of the present disclosure but provided only for the illustrative purpose. The scope of protection of the present disclosure should be construed by the attached claims. All equivalents thereof should be construed as being included within the scope of the present disclosure.

What is claimed is:

1. An apparatus for estimating a slope angle of a road, the apparatus comprising:
   a controller configured to estimate the slope angle of the road, based on a longitudinal slope angle of the road, which is calculated based on a Kinematic model, an effective weight corresponding to a control amount of a driver and a filter constant; and
   an output device configured to output the estimated slope angle of the road and provide the estimated slope angle to control systems in a vehicle to control the vehicle,
   wherein the control amount of the driver includes at least one of an Accel Pedal Sensor (APS) value, a pressure value of a master cylinder, a steering angle of the vehicle, and/or a steering angular speed of the vehicle, and
   wherein the controller is configured to:
   calculate, as an effective value, the minimum value among a lateral steering weight based on the steering angle and the steering angular speed of the vehicle, a longitudinal acceleration weight based on the APS value, and a longitudinal deceleration weight based on the pressure value of the master cylinder.

2. The apparatus of claim 1, wherein the controller is configured to:
   estimate a road slope angle at a present time point using a road slope angle estimated at a previous time point and a road slope angle calculated at the present time point.

3. The apparatus of claim 2, wherein the controller is configured to:
   estimate the road slope angle estimated at the previous time point, as the road slope angle at the present time point, when the effective weight is the minimum value; and
   estimate the road slope angle at the present time point by reflecting the road slope angle estimated at the previous time point more than the road slope angle calculated at the present time point when the effective weight is not the minimum value.

4. The apparatus of claim 3, wherein the controller is configured to:
   estimate the road slope angle at the present time point based on following Equation A, $$\hat{\theta}_{slope,n} = (1-K)\hat{\theta}_{slope,n-1} + K\theta_{slope} \quad \text{Equation A}$$

in which $\hat{\theta}_{slope,n}$ denotes the road slope angle estimated at the present time point, $\hat{\theta}_{slope,n-1}$ denotes the road slope angle estimated at the previous time point, $\theta_{slope}$ denotes the road slope angle calculated at the present time point, and K denotes the final weight.

5. The apparatus of claim 1, wherein the lateral steering weight is a lateral steering weight corresponding to a lateral factor ($L_{factor}$) based on the angle and the steering angular speed of the vehicle, $$L_{factor} = \frac{1}{(l_f + l_r)^2 C_f C_r + mV_x^2(l_r C_r - l_f C_f)} \times \{(l_f + l_r)C_f C_r V_x \delta_f + C_f l_f m V_x^2 \dot{\delta}_f\}$$

in which $l_f$ denotes a distance between a center of gravity of the vehicle and a front wheel, $l_r$ denotes a distance between the center of gravity of the vehicle and a rear wheel, $C_f$ denotes a front axle cornering stiffness, $C_r$ denotes a rear axle cornering stiffness, m denotes a total mass of the vehicle, $V_x$ denotes a longitudinal speed of the vehicle, $\delta_f$ denotes the steering angle of the vehicle, and $\dot{\delta}_f$ denotes the steering angle speed of the vehicle, respectively.

6. The apparatus of claim 5, further comprising:
   a storage configured to store $C_f$, $C_r$, $l_f$, $l_r$, and m;
   a longitudinal speed sensor configured to measure a longitudinal speed ($V_x$) of the vehicle;
   a steering angle sensor configured to measure the steering angle ($\delta_f$) of the vehicle; and
   a steering angular speed sensor configured to measure the steering angular speed ($\dot{\delta}_f$) of the vehicle.

7. A method for estimating a slope angle of a road, the method comprising:
   estimating the slope angle of the road, based on a longitudinal slope angle of the road, which is calculated based on a Kinematic model, an effective weight corresponding to a control amount of a driver and a filter constant;
   outputting the estimated slope angle of the road; and
   controlling a vehicle based on the estimated slope angle of the road,
   wherein the control amount of the driver includes at least one of an Accel Pedal Sensor (APS) value, a pressure value of a master cylinder, a steering angle of the vehicle, and/or a steering angular speed of the vehicle, and
   wherein the estimating of the slope angle of the road includes:
   calculating, as an effective value, the minimum value among a lateral steering weight based on the steering angle and the steering angular speed of the vehicle, a longitudinal acceleration weight based on the APS value, and a longitudinal deceleration weight based on the pressure value of the master cylinder.

8. The method of claim 7, wherein the estimating of the slope angle of the road includes:
   estimating a road slope angle at a present time point using a road slope angle estimated at a previous time point and a road slope angle calculated at the present time point.

9. The method of claim 8, wherein the estimating of the road slope angle at the present time point includes:
   estimating the road slope angle estimated at the previous time point, as the road slope angle at the present time point, when the effective weight is the minimum value, and
   estimating the road slope angle at the present time point by reflecting the road slope angle estimated at the previous time point more than the road slope angle calculated at the present time point when the effective weight is not the minimum value.

10. The method of claim 9, wherein the estimating of the road slope angle at the present time point includes:
    estimating the road slope angle at the present time point based on following Equation A, $$\hat{\theta}_{slope,n} = (1-K)\hat{\theta}_{slope,n-1} + K\theta_{slope} \quad \text{Equation A}$$

in which $\hat{\theta}_{slope,n}$ denotes the road slope angle estimated at the present time point, $\hat{\theta}_{slope,n-1}$ denotes the road slope angle estimated at the previous time point, $\theta_{slope}$ denotes the road slope angle calculated at the present time point, and K denotes the final weight.

11. The method of claim 7, wherein the lateral steering weight is a lateral steering weight corresponding to a lateral factor ($L_{factor}$) based on the steering angle and the steering angular speed of the vehicle, $$L_{factor} = \frac{1}{(l_f + l_r)^2 C_f C_r + mV_x^2(l_r C_r - l_f C_f)} \times \{(l_f + l_r) C_f C_r V_x \delta_f + C_f l_f m V_x^2 \dot{\delta}_f\}$$

in which $l_f$ denotes a distance between a center of gravity of the vehicle and a front wheel, $l_r$ denotes a distance between the center of gravity of the vehicle and a rear wheel, $C_f$ denotes a front axle cornering stiffness, $C_r$ denotes a rear axle cornering stiffness, m denotes a total mass of the vehicle, $V_x$ denotes a longitudinal speed of the vehicle, $\delta_f$ denotes the steering angle of the vehicle, and $\dot{\delta}_f$ denotes the steering angle speed of the vehicle, respectively.

\* \* \* \* \*